United States Patent
Bertin

(10) Patent No.: US 9,124,768 B2
(45) Date of Patent: Sep. 1, 2015

(54) PORTABLE ELECTRONIC ENTITY CAPABLE OF RECEIVING BROADCAST MULTIMEDIA DATA FLOW

(75) Inventor: Marc Bertin, La Celle les Bordes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 1089 days.

(21) Appl. No.: 12/089,607

(22) PCT Filed: May 2, 2007

(86) PCT No.: PCT/FR2007/000752
§ 371 (c)(1),
(2), (4) Date: Apr. 9, 2008

(87) PCT Pub. No.: WO2007/125223
PCT Pub. Date: Nov. 8, 2007

(65) Prior Publication Data
US 2008/0263680 A1    Oct. 23, 2008

(30) Foreign Application Priority Data
May 2, 2006   (FR) ...................................... 06 51572

(51) Int. Cl.
| | | |
|---|---|---|
| H04L 29/06 | (2006.01) | |
| H04N 7/16 | (2011.01) | |
| G06F 21/10 | (2013.01) | |
| H04N 21/414 | (2011.01) | |
| H04N 21/418 | (2011.01) | |
| H04N 21/4367 | (2011.01) | |
| H04N 21/4405 | (2011.01) | |
| H04N 21/442 | (2011.01) | |
| H04N 21/4623 | (2011.01) | |

(52) U.S. Cl.
CPC ................ *H04N 7/163* (2013.01); *G06F 21/10* (2013.01); *H04N 21/4181* (2013.01); *H04N 21/4183* (2013.01); *H04N 21/41407* (2013.01); *H04N 21/4367* (2013.01); *H04N 21/4405* (2013.01); *H04N 21/44236* (2013.01); *H04N 21/4623* (2013.01)

(58) Field of Classification Search
CPC .............. H04N 7/163; H04N 21/4181; H04N 21/44236; H04N 21/4623; H04N 21/4183; H04N 21/4367; H04N 21/4405; H04N 21/41407; G06F 21/10
USPC .......................................................... 726/30
See application file for complete search history.

(56) References Cited

U.S. PATENT DOCUMENTS

2001/0017853 A1* 8/2001 Kikuchi et al. ............... 370/335
(Continued)

FOREIGN PATENT DOCUMENTS

| DE | 20 2006 001 690 U1 | 6/2006 |
|---|---|---|
| EP | 1 387 238 | 2/2004 |

(Continued)

*Primary Examiner* — Michael S McNally
(74) *Attorney, Agent, or Firm* — Young & Thompson

(57) ABSTRACT

A portable electronic entity includes a communication interface (110) with a host terminal (TH), a conversion system (170) for a signal received in a secure multimedia data flow and an element to transmit to the host terminal a flow of multimedia data obtained from the secure multimedia data flow. It also includes systems (160) capable of allowing host terminal restitution of the multimedia data flow that was transmitted.

11 Claims, 2 Drawing Sheets

(56) References Cited

U.S. PATENT DOCUMENTS

| | | |
|---|---|---|
| 2004/0059934 A1* | 3/2004 | Kohiyama et al. ............ 713/200 |
| 2006/0051071 A1* | 3/2006 | Poo et al. ...................... 386/125 |
| 2006/0083228 A1* | 4/2006 | Ong et al. ..................... 370/389 |
| 2006/0123063 A1* | 6/2006 | Ryan et al. .................... 707/201 |
| 2007/0174919 A1* | 7/2007 | Raines et al. .................. 726/27 |

FOREIGN PATENT DOCUMENTS

| | | | |
|---|---|---|---|
| EP | 1 592 232 A1 | 2/2005 | |
| EP | 1 633 133 A2 | 8/2006 | |
| WO | WO 0242886 A1 * | 5/2002 | ............... G06F 1/00 |
| WO | WO 2005/069614 | 7/2005 | |
| WO | WO 2007/060334 A2 | 5/2007 | |

* cited by examiner

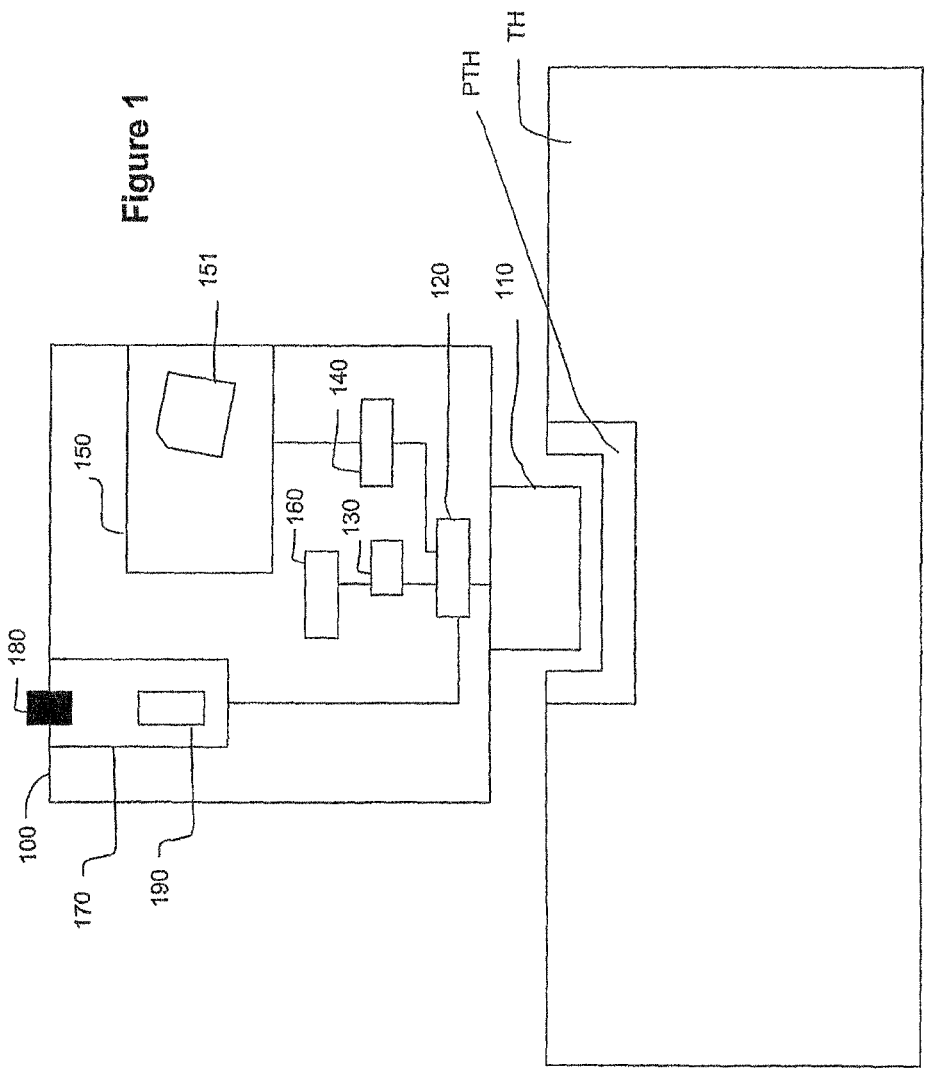

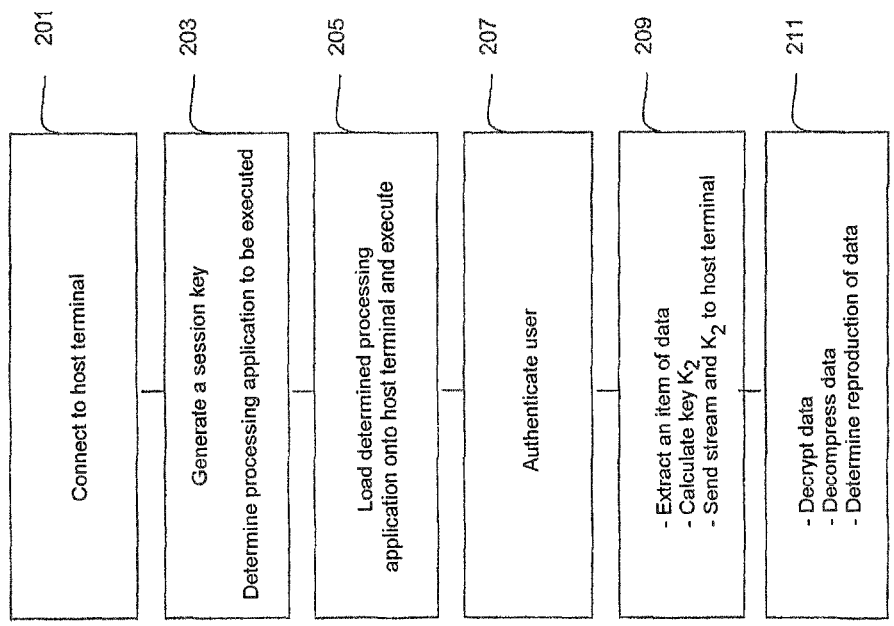

PORTABLE ELECTRONIC ENTITY CAPABLE OF RECEIVING BROADCAST MULTIMEDIA DATA FLOW

BACKGROUND OF THE INVENTION

The present invention relates to a portable electronic entity capable of receiving a broadcast multimedia data stream.

It finds one application in the reception of a broadcast multimedia data stream, including the reception of terrestrial digital television, and in particular reception of pay channels necessitating either a subscription or a payment before viewing.

One example of a portable electronic entity is an electronic key or "dongle", which generally comprises an interface enabling it to be connected to a host terminal, which can be a workstation, a computer, a mobile telephone, a personal assistant, a digital television, an MP3 player, etc. It can be a card with a secure microcontroller conforming to the ISO 7816 standard or a microcircuit card conforming to the MMC (MultiMedia Memory Cards) specification, a mobile telephone, or a PDA. The interface of the electronic key usually conforms to the USB (Universal Serial Bus) standard, which defines a universal serial bus system developed to provide simple and fast management of exchanges of data between a host terminal and a peripheral device, for example a portable electronic entity, a keyboard or other electronic device. The interface of the electronic key can also conform to other standards such as the ISO 7816 standard, the PCMCIA (Personal Computer Memory Card International Association) standard or the MMC standard. The portable electronic entity can also comprise a contactless interface, in particular an interface conforming to the WiFi or Bluetooth standard.

The multimedia data stream includes in particular multimedia data and/or program data. In the case of multimedia data, an audio and/or visual application is required for viewing or listening to the data. In the case of program data, means for executing the data are used. The data is in particular in digital form, for example to the MPEG format, or of DVB (Digital Video Broadcasting) type.

There is known from the document EP 1 633 133, entitled "Portable apparatus for enabling reproduction of television", a USB key including means for receiving a broadcast data stream and means for connection to a host terminal to send the host terminal data obtained from the received data stream. The USB key described in the above document can also include means for recoding and compressing data.

However, this device as described does not make the reproduction of the received data secure.

Indeed, this device does not provide a totally satisfactory degree of security in that neither the host terminal nor the electronic entity are in fact secure. As a result of this a malicious person can obtain data from the stream and use it without having acquired the rights associated with that data.

It is necessary, in particular where pay channels are concerned, that only users who have acquired an authorization, also known as a licence, are in a position to receive the data.

SUMMARY OF THE INVENTION

Among other things, the present invention solves at least one of the problems cited above.

It is therefore directed to a portable electronic entity comprising a communication interface with a host terminal, means for converting a received signal into a secure multimedia data stream and means for transmitting to the host terminal a multimedia data stream obtained from the secure multimedia data stream, characterized in that it comprises means adapted to authorize reproduction in the host terminal of the transmitted multimedia data stream.

The communication interface with the host terminal conforms to the USB standard, for example.

Thus the portable electronic entity is able to command where appropriate reproduction of the data stream broadcast and received in secure form. In this way, according to the invention, reproduction of the data stream is authorized only to approved users and not to malicious users.

According to one possible feature, the means adapted to authorize reproduction comprise means for disabling transmission of information to the host terminal, the disabling means being activated in case of non-reproduction of the multimedia data stream. For example, the disabling means are adapted to command the means for transmitting to disable transmission of the multimedia data stream.

According to this solution, in case of detection of fraudulent manipulations, the data of the received stream is no longer sent to the host terminal so as to prevent transfer of that data to a malicious user.

Alternatively, there could be provision for blocking transmission to the host terminal of a cryptographic key (for example a decrypting key) used in reproducing the stream at the host terminal.

According to a different embodiment, the means adapted to authorize reproduction can comprise stopping means adapted to command the conversion means in such a manner as to prevent said conversion in the case of non-reproduction of the multimedia data stream.

According to another feature that can be envisaged, the means adapted to authorize reproduction can comprise means for decrypting the secure multimedia data stream.

For example, the secure data stream being broadcast in an encrypted form, the portable electronic entity comprises means for decrypting the stream.

In embodiments that can be envisaged, reproduction can be prohibited at the level of the host terminal by the absence of decryption of the stream by the electronic entity (when the latter contains the decryption means) or by not sending a cryptographic key to the host terminal as already mentioned (if the latter contains the decrypting means).

There can also be provision for the portable electronic entity further to comprise means for storing decryption information adapted to decrypt the received multimedia data stream.

According to one embodiment, the portable electronic entity further comprises a memory containing an application for processing the multimedia data stream and loading means adapted to load and to execute said application coming from the memory in the host terminal after connection of the electronic entity to the host terminal.

According to this embodiment, the user of this portable electronic entity can install the application for processing the data stream on any host terminal in order to receive the data, if authorized. Indeed, it is not necessary for the application to be installed beforehand on the host terminal.

According to one possible feature, the received data stream processing application is automatically launching after connection of the portable electronic entity to the host terminal.

According to this feature, without action by the user of the portable electronic entity, the application is automatically installed on the host terminal and executed on connection of the entity to the terminal. As a result, the application is easy to install on the host terminal without complex manipulation by the user.

For example, the means adapted to authorize reproduction comprise security means adapted to make at least in part the execution of said multimedia data stream processing application loaded and executed in the host terminal in this way secure in accordance with a predetermined security mode.

According to this feature, the application is made secure in order to ensure that the data stream received and sent to the application can be processed only by the application.

According to one embodiment, the security means are adapted to form at least a part of said processing application on each loading, for example by selecting the processing application from a plurality of possible applications or by modifying (possibly randomly) before loading a portion of the application stored in the electronic entity into the host terminal. Thus the processing application executed in the host terminal can be different after each loading, for example after each connection of said electronic entity to the host terminal.

For example, the formation of said part uses an value that is unpredictable from outside the electronic entity, of the random or pseudo-random number type, which further improves security.

According to one embodiment, the means for making execution of the data stream processing application secure are adapted to execute a protocol for authentication of the bearer of the entity between said portable electronic entity and the host terminal.

This feature ensures that only the authorized user is able to receive the data of the stream.

According to one feature that can be envisaged, said multimedia data stream processing application uses at least one temporary cryptographic key.

According to another feature that can be envisaged, the means for making the data stream processing application secure are further adapted to make any modification made to said data stream processing application secure.

According to one embodiment the data stream processing application comprises at least two parts: a main program executed by the host terminal and at least one auxiliary program stored and executed in said entity connected to the host terminal, the main program generating commands for execution of all or part of said auxiliary program.

There can also be provision for the auxiliary program also to be divided into a plurality of sections each associated with an authentication code.

According to another possible feature the portable electronic entity comprises means for verification of the authentication code and means for disabling said entity in case of negative verification.

As a result, the data stream cannot be received by an unauthorized user.

For example, the processing application is adapted to decode the multimedia transmitted sent (for example from a DVB type stream to an MPEG type stream) and/or to decompress it, for example by effecting MPEG type decoding.

According to another embodiment, the portable electronic entity further comprises means for making communication between said portable electronic entity and the host terminal secure.

According to this feature, the communication channel between the portable electronic entity and the processing application is made secure.

According to one feature that can be envisaged, the means for making communication secure comprise means for encrypting the multimedia data stream to be sent to the host terminal.

According to another possible feature, the means for encryption of the multimedia data stream are adapted to encrypt the data stream using a session key.

For example, the session key is derived from an item of data (typically a key) contained in the processing application (and thus also known to the electronic entity); this session key can therefore be different on each loading of the processing application.

According to one possible feature, the secure multimedia data stream being encrypted, the security means are adapted to transmit to the host terminal in a secure manner a key for decrypting the secure multimedia data stream.

According to one embodiment the portable electronic entity (100) is a USB key.

The conversion means comprise, for example, a reception interface adapted to be connected to a reception antenna, or alternatively to a cable network. Indeed the signals received can be broadcast by remote communication means (for example of radio-frequency or satellite type) or by means of the cable network.

For example, the conversion means include a demodulator circuit for converting the signal received at its transmission frequency (or at a frequency of the same order) into a base band signal and/or a tuning circuit (for selecting the transmission frequency to be received).

BRIEF DESCRIPTION OF THE DRAWINGS

Other features and advantages of the invention will become apparent in the light of the following detailed description and from the drawings, in which:

FIG. 1 represents diagrammatically the elements of a portable electronic entity connected to a host terminal according to the invention, and FIG. 2 represents an algorithm conforming to the invention for receiving a stream of documents.

DETAILED DESCRIPTION OF THE EMBODIMENTS

Referring to FIG. 1, there are shown the component elements of a portable electronic entity 100, here forming a decoder dongle or USE electronic key. The electronic entity 100 comprises an interface 110 enabling it to be connected to the port PTH of a host terminal TH.

The interface 110 and the port PTH are preferably ports conforming to the USE standard. Alternatively, the interfaces 100 and PTH are of PCMCIA or MMC type.

The host terminal TH is able to receive, read and/or process data.

The portable electronic entity, here a USE key 100, has a general form consisting of circuits typically mounted on a printed circuit. Other architecture variants will obviously be evident to the person skilled in the art.

The USE key 100, although of small size (being indeed a pocket or hand-held electronic entity), enables the circuits described hereinafter to be grouped together. A USE key 100 of this kind also has a connector (part of the interface referred to hereinabove) formed in line with its body, i.e. primarily a cap covering all the electronic circuits and delimiting the exterior volume of the USE key 100.

A concentrator 120, also known as a hub, connects a plurality of peripherals conforming to the USE standard to the USE port 110, in a manner that is known in the art.

The entity 100 comprises a microchip card reader 130 adapted to communicate in accordance with the USE protocol and connected to the hub 120. The microchip card reader 130 is advantageously a standard USE peripheral the controllers whereof are integrated into the operating system of the host terminal TH, which offers the advantage of avoiding installation of such controllers beforehand when using the USB key 100. For example, the microchip card reader comprises a USB CCID (Chip Card Interface Device) type controller.

A microchip card 160 constituting security means is accommodated in the microchip card reader 130; the microchip card 160 (sometimes called a microcircuit card) is adapted in particular to authorize (i.e. to decide on and to command, as it were) reproduction of the data and to make this reproduction of the data secure. The microchip card 160 is for example a card to the ID-000 format conforming to the ISO 7816 standard. The reader 130 comprises a housing for receiving the module of the card 160. A removable cap (not shown) enables the module 160 to be inserted into the appropriate housing, for example.

Alternatively, the microchip card 160 is a secure microcontroller type circuit adapted to communicate in accordance with the USB standard, for example, a circuit fixed directly to and connected to the circuit of the entity 100, with no reader. This kind of secure controller is also capable of deciding to reproduce the data and making its reproduction secure.

The entity 100 further comprises a memory 150. In practice, the memory 150 comprises at least one non-volatile portion. The memory 150 is a 128 Mbyte Flash type memory, for example.

The memory 150 is controlled by a controller 140 itself connected to the hub 120.

The electronic entity further comprises means 170 for receiving a broadcast data stream for converting a received signal, coming from an antenna, for example, into a secure multimedia data stream. These receiving means 170 comprise a reception interface, in particular a connector 180 adapted to be connected to an RF antenna or to a dish for receiving a stream sent by satellite, or to a cable network. The reception interface can equally well be a wireless data receiver, for example conforming to the WiFi or Bluetooth standard.

Alternatively, the electronic entity 100 could include a reception antenna (instead of a connector for such an antenna).

The receiving means 170 here also comprise a tuner circuit and a demodulator circuit 190, here for QPSK demodulation.

The receiving means 170, connected to the hub 120, are thus able to receive a data stream conforming to diverse formats, in particular the MPEG format or the DVB format. At this stage of processing, the data is still secure, for example encrypted by means of a cryptographic key.

The memory 150 stores an application 151 for processing the received data stream, comprising, in particular, means for decrypting the data of the received stream, means for decoding the broadcast stream, in particular adapted to extract the MPEG format data from the DVB stream, and decompression means, for example an MPEG decoder.

In practice, the controller 140 is capable of emulating the operation of a CD ROM drive including software for management of the application 151 for processing the received data stream of the autorun type. In other words, the received data stream processing application management software is executed automatically by the host terminal when the entity 100 is connected to the host terminal TH in accordance with the USB protocol.

Alternatively, the received data stream processing application management software 151 is loaded into a non-volatile ROM area of the controller 140.

In one embodiment, a new version of the application 151 for processing the received data stream or another program is loaded.

This updating is managed by a program stored in the memory 150, for example. To this end, the program is connected securely to an authorized entity, for example to a server of the network, for example using the security means of the microchip card 160, in particular by authentication, encryption or signature.

Indeed, the host terminal to which the entity is connected can be connected to a unidirectional or bidirectional communication network, for example to the Internet network or to a mobile telecommunication network.

This secure communication is provided in particular by means of a session key $K_1$.

Furthermore, the session key can be used in the subsequent embodiments to make communication between the electronic entity (USB key 100) and the host terminal TH, i.e. here the sent data stream processing application, secure.

According to one embodiment, the secure (i.e. protected, for example encrypted) data stream is received by the entity 100 and is decrypted by it (i.e. by the decryption means installed in it). The decrypted stream is then communicated to the processing application 151 installed in the host terminal TH after being encrypted by the session key $K_1$ in the entity 100. The host terminal TH then proceeds to decrypt the stream using the session key $K_1$.

According to another embodiment, the protected (or encrypted) data stream is received by the entity 100, which determines from information contained in the data stream (or received from elsewhere) a temporary encryption key $K_2$. The entity 100 then encrypts the temporary encryption key $K_2$ using the session key $K_1$ and transmits the received data stream and the encrypted temporary encryption key $K_2$ to the processing application 151 installed on the host terminal TH. The host terminal TH, which holds the session key $K_1$, thus has access to the temporary encryption key $K_2$ and can then proceed to decrypt the stream.

The session key is in particular determined from an internal key and from a key extracted from the data stream or from an item of data communicated by some other means: it is stored in the memory 140 and sent to the host terminal TH within the processing application 151, for example.

The method executed in the portable electronic entity is described next with reference to FIG. 2.

The algorithm begins in the step 201 by the connection of the portable electronic entity to the host terminal.

The security means then generate a session key, also called a temporary key (step 203) which is stored, and which is also written into the received data stream processing application 151, in particular by means of the controller 140.

According to one particular embodiment, the security means 160 modify the received data stream processing application 151 on each connection of the portable electronic entity 100 to a host terminal TH.

According to one particular embodiment, the portable electronic entity 100 comprises a plurality of received data stream processing applications 151 and, on each new connection, the electronic entity 100 chooses the processing application 151 to be executed on the host terminal TH at random.

These embodiments enable the portable electronic entity 100 to communicate with a processing application 151 clearly identified by the electronic entity and prevents any user from reading data received by the electronic entity from an application not installed by the portable electronic entity.

The step 203 is followed by the step 205 during which the received data stream processing application 151 is loaded automatically into the random access memory of the host terminal TH and executed by the host terminal on connection of the electronic entity 100 to the host terminal TH.

This automatic loading occurs when the port (or connector) 110 of the entity 100 is engaged in the port PTH of the host terminal TH.

Alternatively, the user loads the data stream processing application 151 manually onto the hard disk of the host terminal, for example using the graphical interface of the host terminal and the controller 140 for reading/writing the memory 150 of the entity 100. In this variant, the controller 140 does not need to emulate a CD ROM in conformance with the USB protocol.

Execution of the data stream processing application 151 is furthermore at least in part made secure in accordance with the invention.

First of all, loading and execution of the data stream processing application 151 by the host terminal are preferably authorized following authentication of the bearer of the portable electronic entity 100 (step 207).

For example, authentication of the bearer of the entity 100 is of the password, identifier, PIN, key type.

For example, the automatic launching of the data stream processing application 151 can include a step for requesting entry and verification of a PIN. This verification step is advantageously executed by the controller 140 or the microchip card 160.

In the step 209, the data processing application extracts an item of data from the stream and transmits it to the security means, which calculate a second temporary key $K_2$ from the extracted data item and a key stored in the memory of the portable electronic entity. The key $K_2$ is sent to the processing application in encrypted form.

In the step 211, the data processing application decrypts the MPEG format data using the key $K_2$, decompresses the MPEG data and reproduces it, for example by means of a screen and audio output.

Moreover, communication between the electronic entity and the processing application executed on the host terminal is made secure, in particular by means of cryptographic mechanisms, for example based on the session key $K_1$, in order to prevent a malicious person obtaining the data when it is sent from the portable electronic entity to the processing application executed on the host terminal.

In another embodiment of the invention, the data stream processing application 151 can comprise at least two parts: a main program executed by the host terminal TH and at least one auxiliary program stored in memory 150 and executed by the entity 100 when it is connected to the host terminal TH.

In this context, the main program generates commands for execution of all or part of said auxiliary program after positive verification in conformance with the authentication protocol of the bearer of the entity described hereinabove.

According to a further embodiment of the invention, the management software 151 can include authentication sequences at given times during execution of the received data stream processing application.

Accordingly, the data stream processing application 151 can include instructions that consist in sending an authentication code coming from the host terminal TH to the microchip card 160. If the authentication code received in this way does not correspond to the authentication code expected by the card 160, the microchip card 160 sends an instruction not to reproduce the received data stream to the disabling means in such a manner as to activate those means. As a result, the disabling means disable transmission of the data stream to the host terminal, for example, reception by the entity 100 of the broadcast data stream or simply transmission of the decryption key $K_2$ without which the processing application cannot reproduce the video stream.

Alternatively, the instruction disabling reproduction can be sent to the host terminal by the microchip card 160.

In this case, this instruction has the function of disabling reproduction of the data stream broadcast in particular to the user, for example, or reception by the host terminal of the data stream.

The instruction disabling reproduction can also correspond to a data item written specifically into non-volatile memory of the card 160 to prevent operation of the entity 100 subsequently and thus to disable the entity, for example as described hereinabove.

In one embodiment that can be envisaged, the prohibition of reproduction (and therefore the disabling of the electronic entity and/or of the transmission of information enabling reproduction in the host terminal) can be decided on by the electronic entity 100 as a function of rights of access to the received multimedia data stream stored in the microchip card 160, for example on the basis of comparison (where appropriate periodic comparison) of identifiers incorporated into the secure stream with identifiers contained in the memory of the card 160 as a function of licences held by the card 160 for the audiovisual programs that the received streams are liable to represent.

Making the data stream processing application 151 secure can also include random elements to provide an additional degree of security.

Firstly, this random aspect can be applied if the stream processing application 150 comprises authentication sequences consisting in sending authentication codes as described hereinabove. These authentication codes can be modified in a random or pseudo-random manner.

Similarly, the time of sending these authentication codes can also be random, advantageously within a predetermined limited range.

Secondly, this random aspect can be applied if the data stream processing application 151 is divided into two parts, a main part executed by the host terminal TH and an auxiliary part executed by the entity 100. The division area or areas are random, for example. This random division can be operative on each loading of the stream processing application 151 into the host terminal TH, for example occurring automatically after each connection of the portable electronic entity 100 to the host terminal TH.

For example, the data stream processing application 151 can be predivided into a plurality of sections in a memory area of the memory 150 or in a ROM area of the controller 140. Each section is further associated with communication instructions enabling communication between the terminal TH and the entity 100. This association is operative, for example, if the data stream processing application 151 is divided into a plurality of parts and/or when sending authentication codes as described hereinabove. Groups of contiguous sections are then selected randomly and, of the communication instructions associated with each section, there are executed only the communication instructions separating two groups of sections selected in this way. In practice, each section of the data stream processing application can have a different size. Each section consists of codes written in machine language, assembler language, C, Java, etc.

To strengthen protection further, the entity 100 can further include means for verification of a condition on the frequency of a certain type of data communicated to said entity 100 by the data stream processing application 151 executed by the host terminal TH.

Thus the entity 100, and more particularly the microchip card 160, is capable of verifying the frequency at which the authentication codes are received from the host terminal TH.

The frequency can be measured relative to time. In this context, the entity 100 comprises a clock or any time measuring means.

According to one embodiment, the condition on the frequency is associated with a threshold or a minimum frequency. Here the frequency concept is to be understood in a broad sense. Indeed, a time-delay can be started in the entity 100 on each authentication code of the application 151 received from the terminal TH. At the end of the time-delay, for example at the end of one minute, if there has been no further authentication, an anomaly is detected, leading for example to the received data stream not being reproduced in response to a command coming from the microchip card 160.

Thanks to the invention, the bearer of the portable electronic entity 100, in particular a USB electronic key, can therefore be connected to any host computer, without having to install beforehand any broadcast data stream processing application. Indeed, according to the invention, once connected to the host terminal, the portable electronic entity is responsible for installing the application for processing the data stream received by the entity, without consideration as to the configuration of the host terminal or to making secure communication between the portable electronic entity and the processing application installed on the host terminal.

The invention claimed is:

1. A portable electronic entity, comprising:
   a communication interface (110) configured to interface and communicate with a host terminal (TH);
   a receiver (170) configured to receive a secure multimedia data stream;
   a storage device enabled to store decryption information, the decryption information adapted to decrypt the received multimedia data stream;
   an authorization device (160) enabled to authorize reproduction in the host terminal of multi-media contents of the received multimedia data stream; and
   a memory having stored thereon an application configured to execute on a CPU of the host terminal,
   the application comprising executable code configured for execution by the CPU of the host terminal,
   wherein the authorization device (160) is configured to generate a session key and to incorporate the session key into the application stored in the memory,
   wherein the interface is configured to, upon connection with the host terminal, transmit the application from the memory to the host terminal to be stored in a memory of the host terminal and executed by the CPU of the host terminal,
   wherein the electronic entity includes a decrypting device that decrypts the secure multimedia data stream into a decrypted multimedia data stream, and
   wherein the application, upon execution by the CPU of the host terminal, uses the session key to establish a secure encrypted communication channel with the authorization device (160), and
   wherein the authorization device uses the session key to securely transmit the decrypted multimedia data stream to the host terminal via the secure encrypted communication channel established with the application executing on the host terminal.

2. The portable electronic entity according to claim 1, wherein the authorization device comprises a disabling component configured to disable transmission of information to the host terminal, the disabling component being activated in case of non-reproduction of the multimedia data stream.

3. The portable electronic entity according to claim 2, wherein the disabling component is adapted to command the transmitting interface to disable the transmission of the multimedia data stream.

4. The portable electronic entity according to claim 1, wherein the reproduction device comprises a stopping mechanism adapted to command the receiver in such a manner as to prevent said conversion in the case of non-reproduction of the multimedia data stream.

5. The portable electronic entity according to claim 1, wherein the received data stream processing application (151) is launched automatically after connection of the portable electronic entity (100) to the host terminal (TH).

6. The portable electronic entity according to claim 1, wherein the communication interface (110) with the host terminal (TH) conforms to the USB standard.

7. The portable electronic entity according to claim 1, wherein the portable electronic entity (100) is a USB key.

8. The portable electronic entity according to claim 1, wherein the receiver further comprises a reception interface adapted to be connected to a reception antenna.

9. The portable electronic entity according to claim 1, wherein the receiver further comprises a reception interface adapted to be connected to a cable network.

10. The portable electronic entity according to claim 1, wherein the receiver further comprises a demodulator circuit.

11. A portable electronic entity, comprising:
    a communication interface (110) configured to communicate with a host terminal (TH);
    a receiver (170) configured to receive a wireless transmission stream;
    an authorization device (160) enabled to authorize reproduction in the host terminal of the transmitted multimedia data stream;
    a memory containing an application (151) for processing the multimedia data stream, the application being configured to be executed by a CPU of the host terminal; and
    a loading component adapted to, after connection of the electronic entity to the host terminal, load said application into the host terminal (TH) and execute said application in the host terminal (TH),
    wherein the authorization device, upon initiation of communication between the communication interface (110) and a communications bus of the host terminal (TH), generates a session key and stores said session key in the memory of the electronic entity and incorporates said session key into the application (151) in the memory, said application being subsequently transmitted to the host terminal via the communication interface (110), and
    wherein the application (151), upon execution by the CPU of the host terminal (TH), causes the host terminal (TH) to communicate with the electronic entity and receive the transmission stream in an encrypted form based on said session key.

* * * * *